United States Patent
Lee et al.

(10) Patent No.: US 9,367,291 B2
(45) Date of Patent: Jun. 14, 2016

(54) APPARATUS AND METHOD FOR GENERATING VECTOR CODE

(71) Applicants: Samsung Electronics Co., Ltd., Suwon-si (KR); Seoul National University R&DB Foundation, Seoul (KR)

(72) Inventors: Jin-Seok Lee, Seoul (KR); Seong-Gun Kim, Yongin-si (KR); Dong-Hoon Yoo, Seongnam-si (KR); Seok-Joong Hwang, Seoul (KR); Jeongho Nah, Seoul (KR); Jaejin Lee, Seoul (KR); Jun Lee, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 14/228,868

(22) Filed: Mar. 28, 2014

(65) Prior Publication Data

US 2014/0297992 A1 Oct. 2, 2014

Related U.S. Application Data

(60) Provisional application No. 61/806,451, filed on Mar. 29, 2013.

(30) Foreign Application Priority Data

Nov. 8, 2013 (KR) .................. 10-2013-0135611

(51) Int. Cl.
*G06F 9/45* (2006.01)

(52) U.S. Cl.
CPC ..................................... *G06F 8/40* (2013.01)

(58) Field of Classification Search
None
See application file for complete search history.

(56) References Cited

U.S. PATENT DOCUMENTS

| | | |
|---|---|---|
| 2011/0161944 A1* | 6/2011 | Cho et al. .................. 717/149 |
| 2012/0191953 A1 | 7/2012 | Eichenberger et al. |
| 2012/0229481 A1 | 9/2012 | McCrary et al. |
| 2013/0036409 A1 | 2/2013 | Auerbach et al. |

FOREIGN PATENT DOCUMENTS

KR 10-2011-0077720 7/2011

* cited by examiner

*Primary Examiner* — Qamrun Nahar
(74) *Attorney, Agent, or Firm* — NSIP Law

(57) ABSTRACT

An apparatus and method for generating vector code are provided. The apparatus and method generate vector code using scalar-type kernel code, without user's changing a code type or modifying data layout, thereby enhancing user's convenience of use and retaining the portability of OpenCL.

22 Claims, 15 Drawing Sheets

FIG. 2A

```
_kernel void templateKernel(_global unsigned int * output,
                            _global unsigned int * input,
                            const    unsigned int multiplier)
{
   unit tid = get_global_id(0);

output[tid] = input[tid] * 2;
}
```

FIG. 2B

```
_kernel void templateKernel(_global unsigned int4 * output,
                            _global unsigned int4 * input,
                            const    unsigned int multiplier)
{
   unit tid = get_global_id(0);

output[tid] = input[tid] * (int4)(2);
}
```

FIG. 4A

```
void vec_add(int *output, int *input) {
int id;

for(int __k = 0; __k < __local_size[2]; __k++){
   for(int __j = 0; __j < __local_size[1]; __j++){
     for(int __i = 0; __i < __local_size[0]; __i++){
       id = get_global_id(0);
       output[id] = input[id] * 2;
     }
   }
 }
}
```

FIG. 4B

```
void vec_add(int *output, int *input) {
  int4 *vOutput = (int4*)output;    ⎫
  int4 *vInput = (int4*)input;      ⎬ 410
  int id;                           ⎭ for(int __k = 0; __k < __local_size[2]; __k++){
    for(int __j = 0; __j < __local_size[1]; __j++){
      for(int __i = 0; __i < __local_size[0]; __i++){
        id = get_global_id(0);
        output[id] = input[id] *((int4)(2);~ 420
      }
    }
  }
}
```

FIG. 4C

```
void vec_add(int *output, int *input) {
  int4 *vOutput = (int4*)output;
  int4 *vInput = (int4*)input;
  int id;

for(int __k = 0; __k < __local_size[2]; __k++){
    for(int __j = 0; __j < __local_size[1]; __j++){
      for(int __i = 0; __i < __local_size[0]; __i++){
        id = get_global_id(0);
        vOutput[id] = vInput[id] * (int4)(2);
      }                    ~430
    }
  }
}
```

FIG. 4D

```
void vec_add(int *output, int *input) {
  int4 *vOutput = (int4*)output;
  int4 *vInput = (int4*)input;
  int id;

for(int __k = 0; __k < __local_size[2]; __k++){
    for(int __j = 0; __j < __local_size[1]; __j++){
      for(int __i = 0; __i < __local_size[0]; __i+=4){
        id = get_global_id(0);
        vOutput[id/4] = vInput[id/4] * (int4)(2);      440
      }          450         450
    }
  }
}
```

FIG. 6A

```
void vec_add(float *A, float *B, int P) {
  int id;
  for(int __k = 0; __k < __local_size[2]; __k++){
    for(int __j = 0; __j < __local_size[1]; __j++){
      for(int __i = 0; __i < __local_size[0]; __i++){
        id = get_global_id(0);
        B[id] = A[id] + P;
      }
    }
  }
}
```

FIG. 6B

```
void vec_add(float *A, float *B, int P) {
  float4 *vA = (float4*)A;
  float4 *vB = (float4*)B;        610
  float4 vP = convert_float4(P);
  int id;
  for(int __k = 0; __k < __local_size[2]; __k++){
    for(int __j = 0; __j < __local_size[1]; __j++){
      for(int __i = 0; __i < __local_size[0]; __i++){
        id = get_global_id(0);
        B[id] = A[id] * P;
      }
    }
  }
}
```

FIG. 6C

```
void vec_add(float *A, float *B, int P) {
  float4 *vA = (float4*)A;
  float4 *vB = (float4*)B;
  float4 vP = convert_float4(P);
  int id;
  for(int __k = 0; __k < __local_size[2]; __k++){
    for(int __j = 0; __j < __local_size[1]; __j++){
      for(int __i = 0; __i < __local_size[0]; __i++){
        id = get_global_id(0);
        vB[id] = vA[id] * vP;
      }
                   620
    }
  }
}
```

FIG. 6D

```
void vec_add(float *A, float *B, int P) {
  float4 *vA = (float4*)A;
  float4 *vB = (float4*)B;
  float4 vP = convert_float4(P);
  int id;
  for(int __k = 0; __k < __local_size[2]; __k++){
    for(int __j = 0; __j < __local_size[1]; __j++){
      for(int __i = 0; __i < __local_size[0]; __i+=4){
        id = get_global_id(0);
        vB[id/4] = vA[id/4] * vP;
      }
    }
  }
}
```

630

640  640

APPARATUS AND METHOD FOR GENERATING VECTOR CODE

CROSS-REFERENCE TO RELATED APPLICATION(S)

This application claims priority from U.S. Provisional Patent Application No. 61/806,451, filed on Mar. 29, 2013, in the U.S. Patent and Trademark Office, and Korean Patent Application No. 10-2013-0135611, filed on Nov. 8, 2013, in the Korean Intellectual Property Office, the disclosures of which are incorporated herein by references in their entireties.

BACKGROUND

1. Field

The following description relates to Open Computing Language.

2. Description of the Related Art

With the recent increase of use of performance accelerators in mobile computing, more attention has been given to programming models for supporting the relevant environment. Especially, Open Computing Language (OpenCL) supports various devices and architectures and allows the same program to be executed on these devices and architectures. However, to write a program to have performance portability, an additional and troublesome optimization process for an intended architecture may be required.

One way to overcome such problems may be a use of an OpenCL compiler for optimization (hereinafter, referred to as an "OpenCL optimization compiler"). However, the OpenCL optimization compiler does not support vector code generation. Therefore, in an architecture that utilizes vector unit, a user may need to manually change arrays and variables within kernel code into vector-type arrays and vector-type variables, respectively, and accordingly may need to change data layout handled by each work-item.

Further, kernel code written to directly use vector code may be optimized in accordance with characteristics of specific vector unit supported by a particular device, and thus it may be difficult to ensure the performance portability.

SUMMARY

In one general aspect, there is provided a method for generating vector code, including: detecting an induction variable and an index variable from scalar-type kernel code that contains a loop nest that represents an instance of a work-item; determining whether requirements for transforming the scalar-type kernel code into vector-type code are satisfied, based on the detected induction variable and index variable; and in response to the requirements being satisfied, transforming the scalar-type code into the vector-type code.

The determining may include, in response to a determination that index values of arrays within the scalar-type kernel code are discontinuous, determining that the requirements are not satisfied.

The determining may include, in response to a determination that an index value of an array within the scalar-type kernel code cannot be statically analyzed, determining that the requirements are not satisfied.

The determining may include, in response to the scalar-type kernel code containing access to a private array, determining that the requirements are not satisfied.

The determining of the scalar-type kernel code may include, in response to the scalar-type kernel code containing calls to a variable defined by a user or to a function, other than a built-in function, determining that the requirements are not satisfied.

The transforming of the scalar-type kernel code may include re-declaring any of a variable used as a factor of function within the scalar-type kernel code and a variable defined within the scalar-type kernel code, other than the induction variable, as a vector-type variable, and changing a variable reference used within syntax transformable into vector-type in the scalar-type kernel code to the re-declared vector-type variable.

The syntax transformable into vector-type may use the induction variable as an index of an array and is not a conditional branch.

The transforming of the scalar-type kernel code may include applying a vectorization factor to an induction variable of an innermost loop within the loop nest and to an induction variable used as an index of an array.

The applying of the vectorization factor may include dividing the induction variable used as the index of the array by the vectorization factor and transforming an increment of the induction variable of the innermost loop within the loop nest to the vectorization factor.

The transforming of the scalar-type kernel code may include copying syntax of the scalar-type kernel code which is unavailable to be transformed to the vector-type.

The transforming of the scalar-type kernel code may include, in response to the scalar-type kernel code containing a conditional branch, copying the conditional branch as many times as a vectorization factor and transforming access to a variable and an array within a copied conditional branch into access to sequential vector elements.

In another general aspect, there is provided an apparatus for generating vector code, including: a processor; an analyzer configured to detect an induction variable and an index variable from scalar-type kernel code that contains a loop nest that represents an instance of a work-item, using the processor; a determiner configured to determine, using the processor, whether requirements for transforming the scalar-type kernel code into vector-type code are satisfied, based on the detected induction variable and index variable; and a vector code generator configured to transform, in response to a determination that the requirements are satisfied, the scalar-type kernel code into the vector-type code.

The determiner may be configured to, in response to a determination that index values of arrays within the scalar-type kernel code are discontinuous, determine that the requirements are not satisfied.

The determiner may be configured to, in response to a determination that an index value of an array within the scalar-type kernel code cannot be statically analyzed, determine that the requirements are not satisfied.

The determiner may be configured to, in response to the scalar-type kernel code containing access to a private array, determine that the requirements are not satisfied.

The determiner may be configured to, in response to the scalar-type kernel code containing calls to a variable defined by a user or to a function, other than a built-in function, determine that the requirements are not satisfied.

The vector code generator may be configured to re-declare any of a variable used as a factor of function within the scalar-type kernel code and a variable defined within the scalar-type kernel code, other than the induction variable, as a vector-type variable, and to change a variable reference used within syntax transformable into vector-type in the scalar-type kernel code to the re-declared vector-type variable.

The syntax transformable into vector-type may use the induction variable as an index of an array and may not be a conditional branch.

The vector code generator may be configured to apply a vectorization factor to an induction variable of an innermost loop within the loop nest and to an induction variable used as an index of an array.

The vector code generator may be configured to divide the induction variable used as the index of the array by the vectorization factor and to transform an increment of the induction variable of the innermost loop within the loop nest to the vectorization factor.

The vector code generator may be configured to copy syntax of the scalar-type kernel code which is unavailable to be transformed to the vector-type.

The vector code generator may be configured to, in response to the scalar-type kernel code containing a conditional branch, copy the conditional branch as many times as a vectorization factor and transform access to a variable and an array within a copied conditional branch into access to sequential vector elements.

Other features and aspects will be apparent from the following detailed description, the drawings, and the claims.

BRIEF DESCRIPTION OF THE DRAWINGS

FIGS. 2A and 2B are diagrams illustrating an example of changing variables of Open Computing Language (OpenCL) kernel code into vector-type variables.

FIGS. 4A to 4D are diagrams for explaining vector code generation according to an exemplary embodiment.

FIGS. 6A to 6D are diagrams for explaining vector code generation according to another exemplary embodiment.

Figure 1:
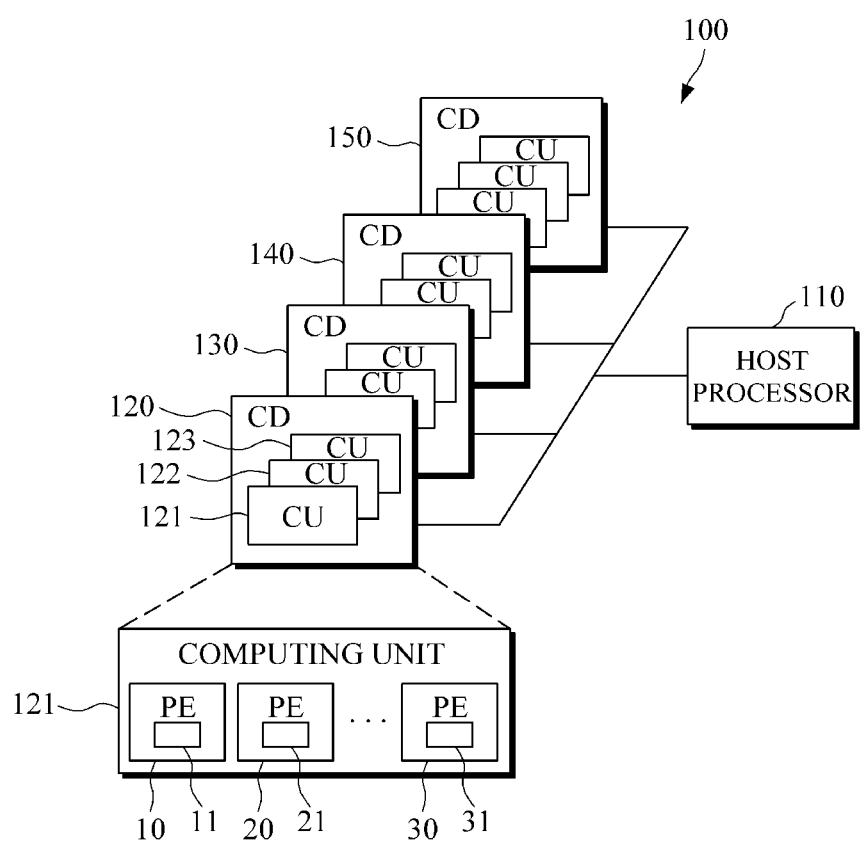
FIG. 1 is a diagram illustrating an example of a system on which an OpenCL program runs.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating an example of a system on which an OpenCL program runs.

Referring to FIG. 1, an OpenCL program runs on a platform that includes a host processor 110 and one or more computing devices 120, 130, 140, and 150.

Each computing device 120, 130, 140, and 150 includes one or more computing units. For example, computing device 120 may include a plurality of computing units 121, 122, and 123. Each computing unit includes one or more processing elements (PEs). For example, computing unit 121 may include processing elements 10, 20, and 30. Here, a processing element may be a scalar processor or a vector processor. The processing elements 10, 20, and 30 may include private memories 11, 21, and 31, respectively.

The OpenCL program may be written such that a host program running on a host processor may execute a kernel on a device. An OpenCL application may include a host program and kernels.

The host program may execute on the host processor 110, and may submit commands to perform computation on the processing elements 10, 20, and 30 within the computing device 120, or to manipulate memory objects.

A kernel is a function executed on an OpenCL device. A kernel may be referred to as "kernel code" or a "kernel function." Hereinafter, the kernel will be referred to as "kernel code." Kernel code may include a plurality of statements. To execute a kernel code, the host program may designate the numbers of work-groups and work-items.

A "work-group" is a collection of work-items. A work-item is a kernel code's execution units that are executed in parallel. The work-group may include one or more work-items. One work-group may be assigned to one computing unit, and work items within the same work group may execute as if they were concurrently executed on one or more virtual elements.

In OpenCL, the host program may define a kernel as an N-dimensional abstract index space, where $1 \leq N \leq 3$. Each point in the index space may be specified by an N-tuple of integers with each dimension starting at zero. Each point may be associated with a kernel's execution instance which is called a "work-item."

The N-tuple is a global ID of a corresponding work-item. Each work-item may query its global ID and may perform a different task and access different data based on its global ID. Each work-group has a unique ID which is an N-tuple. An integer array of a length N may specify the number of work-groups in each dimension of the index space. A work-item in a work-group may be assigned a unique local ID, and the entire work-group may be treated as a local index space. A global ID of a work-item may be computed using its local ID and work-group ID. Work-items in a work-group may execute concurrently on processing elements of a single computing unit.

OpenCL defines four distinct memory regions: global, constant, local, and private. A computing device memory may include the global and constant memory regions. A kernel may statically allocate memory objects to the constant and local memory regions.

The local memory region may be shared by all work-items in the same work-group. In contrast, the private memory region may be local to one work-item and may be included in a processing element.

The memory regions defined by OpenCL may be accessible by work-items, and OpenCL may have four address space qualifiers to distinguish these memory regions: _global, _constant, _local, and _private. These address space qualifier may be used in variable declaration in the kernel code.

Written kernel code needs to execute on all different types of architectures since OpenCL is to be executable on various devices and architectures. To this end, an OpenCL optimization compiler that uses source-level translation may be used. The OpenCL optimization compiler may use a method, for example, work-item coalescing, which results in the best performance for a different architecture.

For example, the OpenCL optimization compiler may identify a kernel code region that a work-item coalescing loop may enclose. Then, the OpenCL optimization compiler may use variable expansion to generate a triply nested loop by enclosing the identified kernel code region with a work-item coalescing loop.

In this case, however, a user needs to manually transform code into vector code in an architecture that uses vector units. For example, referring to FIG. 2A, to execute kernel code that uses scalar type variables and scalar type arrays in vector units, the user may need to change the scalar-type variables and constant-literal into vector type "int 4," as shown in FIG. 2B.

However, when the type of variables is changed into a vector type as shown in FIG. 2B, the transformed kernel code may be optimized in accordance with the characteristics of the vector unit supported by a particular device. In this case, the transformed kernel code becomes unusable by a device that does not include a vector unit, and thereby portability, as one of OpenCL's characteristics, may be reduced.

The work-item coalescing technique simply generates a loop nest, but does not reduce a size of an index for memory access. Thus, the size of memory that can be accessed at one time by using vector-type increases, so that there may be access to a non-memory region. To prevent such a problem, a user needs to manually modify a memory layout by adjusting a global work size on a host program.

Figure 3:
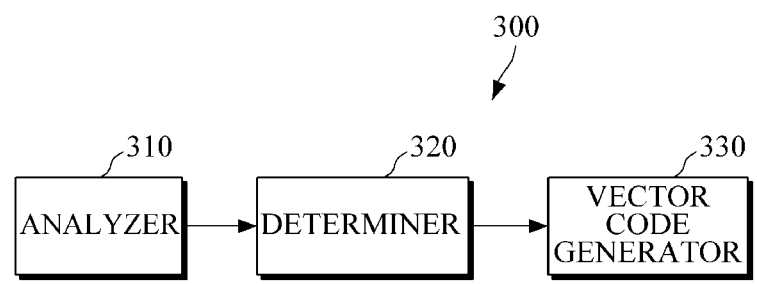
FIG. 3 is diagram illustrating an apparatus for generating vector code according to an exemplary embodiment.

FIG. 3 is a diagram illustrating an example of an apparatus for generating vector code.

The apparatus 300 for generating vector code may generate vector code using scalar-type kernel code that includes a loop nest that represents a work item's instance. In this case, the loop nest may be generated using, for example, a work-item coalescing technique as disclosed in Korean Patent Application Publication No. 10-2011-0077720.

Referring to FIG. 3, the apparatus 300 may include an analyzer 310, a determiner 320, and a vector code generator 330.

The analyzer 310 may detect an induction variable and an index variable, which correspond to work-item IDs, from scalar-type kernel code. The induction variable refers to a linear function of a variable that increases or decreases by a fixed quantity in each iteration of loop, or may refer to a linear function of another induction variable. For example, in the case of syntax "for (i=0; i<10; ++i) {j=17+i;}," "i" and "j" represent induction variables.

The index variable refers to a variable that indicates a location in an array. For example, in the case of syntax "int A[10]; A[i]=5;" i represents an index variable.

An instance of a work-item that executes kernel code may be represented as a loop nest on a three-dimensional index space. Each iteration of the innermost loop of the loop nest is independently executable as defined by OpenCL specification, and thus it can be a target of vector code generation. In addition, the work-item ID may be represented by equation for index variables of the innermost loop in the loop nest. Thus, the analyzer 310 may detect an induction variable and an index variable, which correspond to work-item IDs, from scalar-type kernel code.

The determiner 320 may determine whether the scalar-type kernel code can be transformed into vector-type code based on the detected induction variable and index variable. More specifically, since the vector-type code is generated by converting a series of scalar values into a vector value, index values of the arrays should be continuous, and should not be dynamically changed. Therefore, to transform scalar-type kernel code into vector-type kernel code, the following requirements 1), 2), 3), and 4) need to be satisfied.

1) An index of an array should be represented by an expression that is statically analyzable by a compiler.

For example, in the case of syntax of "out [yid*w+xid] =col;" "yid*w+xid" is an expression that represents the index of the array. Here, "yid" and "xid" are index variables for a loop nest, and especially, "xid" is an index variable for the innermost loop. "w" is a factor of kernel function. That is, "yid," "xid," and "w" are determinable during compile time, and thus "yid*w+xid" is statically analyzable by the compiler.

For example, in the case of syntax of "[yid*val+xid]=col;" "yid*val+xid" is an expression that represents an index of an array. Here, "val" is read out from memory. In this case, a value of "val" is determined during execution time, and hence it is not possible to identify a value of variable "val" during the compiling operation. Thus, "yid*val+xid" cannot be statically analyzed by a compiler.

2) A result of an expression that represents an index of an array should have consecutive values with respect to iterations of the innermost loop.

For example, in the case of syntax of "out [yid*w+xid] =col;" "yid*w+xid" has consecutive values with respect to iterations of the innermost loop.

In another example, in the case of syntax of "out [yid*w+ xid*2]=col;" work items are not consecutive values, but multiples of 2, and they access the array, and thus a result of the expression that represents the index of the array does not have continuous values with respect to iterations of the innermost loop.

3) In a case where a variable used as an index of an array is not an induction variable, the used variable should have a loop-invariant value.

For example, in the case of syntax of "out [yid*w+xid] =col;" "w" is not an induction variable, but a factor of kernel function, which is a loop-invariant value, and is used for an expression that represents an index of the array. Thus, this syntax meets requirement 3).

In the case of syntax of "out [yid*val+xid]=col;" a value of variable "val" is determined to a value that is stored in memory during execution time, and hence it is difficult to confirm whether this syntax meets requirement 2). Therefore, vector code generation may not be feasible using this syntax.

4) There should be no access to a private array, a variable defined by a user should not be used, and any function, other than built-in function, should not be used.

When a scalar-type kernel code meets all the above four requirements, the determiner 320 may determine that the scalar-type code can be transformed into vector-type code.

In response to the determination that the scalar-type code can be transformed into vector-type code, the vector code generator 330 may transform syntax within the scalar-type kernel code into vector-type syntax.

More specifically, the vector code generator 330 may re-declare, as a vector-type variable, any of variables used as function factors within the scalar-type kernel code and local variables defined within the scalar-type kernel code, other than the induction variable.

In addition, the vector code generator 330 may change a variable reference within the syntax of the scalar-type kernel code that is transformable into vector type into a variable reference of the re-declared vector type variable. In this case, the syntax transformable into vector type may include syntax that uses an induction variable as an index of an array and is not a conditional branch.

The vector code generator 330 may apply a vectorization factor to an induction variable used as an index of an array in the scalar-type kernel code and to an induction variable of the innermost loop. More specifically, in a case where the induction variable is used as an index of an array, the vector code generator 330 may transform the expression that represents the index of the array, such that the expression is divided by the vectorization factor. In addition, the vector code generator 330 may transform an increment value of the induction variable of the innermost loop to a vectorization factor. In this case, the vectorization factor may depend on a vector size supported by hardware. For example, in the case where 16-byte vector is supported, 4 is a vectorization factor for "int," 8 is a vectorization factor for "short," and 16 is a vectorization factor for "char."

The vector code generator 330 may copy syntax of the scalar-type kernel code, which is not transformable into vector type, using a code copying mechanism. In one example, if the scalar-type kernel code contains a conditional branch, the vector code generator 330 may copy a conditional branch as many times as the vectorization factor. In addition, the vector code generator 330 may transform access code for variables and an array within the copied conditional branch into access to sequential vector elements.

In one example, a vector code generating apparatus 300 shown in FIG. 3 may be implemented as a microprocessor that executes program codes and a collection of program codes. For example, each element of the vector code generating apparatus 300 shown in FIG. 3 may be a specific collection of program codes executed by the host processor 100. In addition, the elements of the vector code generating apparatus 300 may represent functions implemented by program code on the processor, and may not be distinctively distinguished with respect to a specific operation.

FIGS. 4A to 4D are diagrams for explaining vector code generation according to an exemplary embodiment.

FIG. 4A illustrates an example of scalar-type kernel code.

Referring to FIGS. 4A and 4B, the vector code generator 330 changes variables, other than parameters and induction variable declared in the kernel code shown in FIG. 3A, into vector-type variables.

More specifically, the vector code generator 330 re-declarers "int*output" and "int*input" that are pointer variables as vector-type variables in 410. The vector code generator 330 transforms a constant literal within the kernel code into the vector-type 420.

In FIG. 4A, "output[id]=input[id]*2" uses induction variable "id" as an index of the array, and is not a conditional branch, and thus "id" can be transformed into vector-type. Referring to FIG. 4C, the vector code generator 330 may change the variable reference used in syntax transformable into vector type to "vOutput" and "vInput," as shown in 430, which are re-declared vector-type variables.

Referring to FIG. 4D, the vector code generator 330 may apply a vectorization factor to an index variable of the innermost loop and to an induction variable used as an index of the array.

More specifically, the vector code generator 330 may change an increment of the index value of the innermost loop to a vectorization factor, 4, as shown in 440. Also, the vector code generator 330 may divide the induction variable "id" used as an index of the array by the vectorization factor, 4, as shown in 450. In this example, the vectorization factor is given as 4, but the aspects of the embodiments are not limited thereto, such that the vectorization factor may be determined depending on the vector size supported by hardware.

Figure 5:
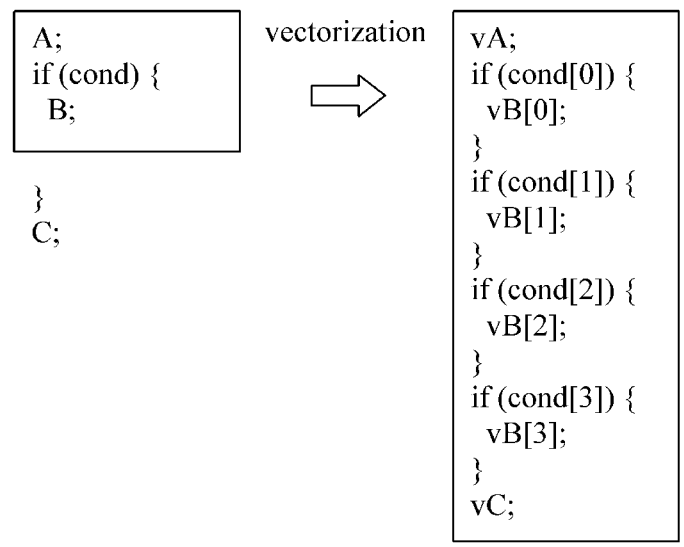
FIG. 5 is a diagram for explaining of vector code generation in the presence of a conditional branch according to an exemplary embodiment.

FIG. 5 is a diagram for explaining of vector code generation in the presence of a conditional branch according to an exemplary embodiment.

Referring to FIG. 5, in a case where scalar-type kernel code contains a conditional branch, the vector code generator 330 may generate vector code using a code copying mechanism. More specifically, the vector code generator 330 may copy a conditional branch as many times as a vectorization factor, and transform access to a variable and array within the copied branches into access to sequential vector elements.

In this example, it is assumed that the vectorization factor is 4. Thus, the conditional branch is copied four times. Also, access to each array within each copied conditional branch is transformed into access to sequential vector elements.

FIGS. 6A to 6D are diagrams for explaining vector code generation according to another exemplary embodiment.

Examples of FIGS. 6A to 6D assumes that vectorization factor is 4.

Referring to FIG. 6A, transformation of an induction variable in a scalar-type kernel code into vector-type is possible since syntax, "B[id]=A[id]+P," used as an index of an array is not a conditional branch.

Referring to FIG. 6B, pointer variables "*A" and "*B" and a variable "P" become factors of function in kernel code of FIG. 6A, and the vector code generator 330 may re-declare these variables as vector-type variables 610.

Referring to FIG. 6C, variable references used in syntax transformable into vector-type may be changed to vector-type variables 620, "vB," "vA," and "vP," which are re-declared in FIG. 5B, by the vector code generator 330.

Referring to FIG. 6D, the vector code generator 330 may change an increment of an induction variable, "i," of the innermost loop to a vectorization factor, 4, as shown in 630. Also, the vector code generator 330 may divide the induction variable, "id," used as an index of an array, by the vectorization factor, 4, as shown as 640.

Figure 7:
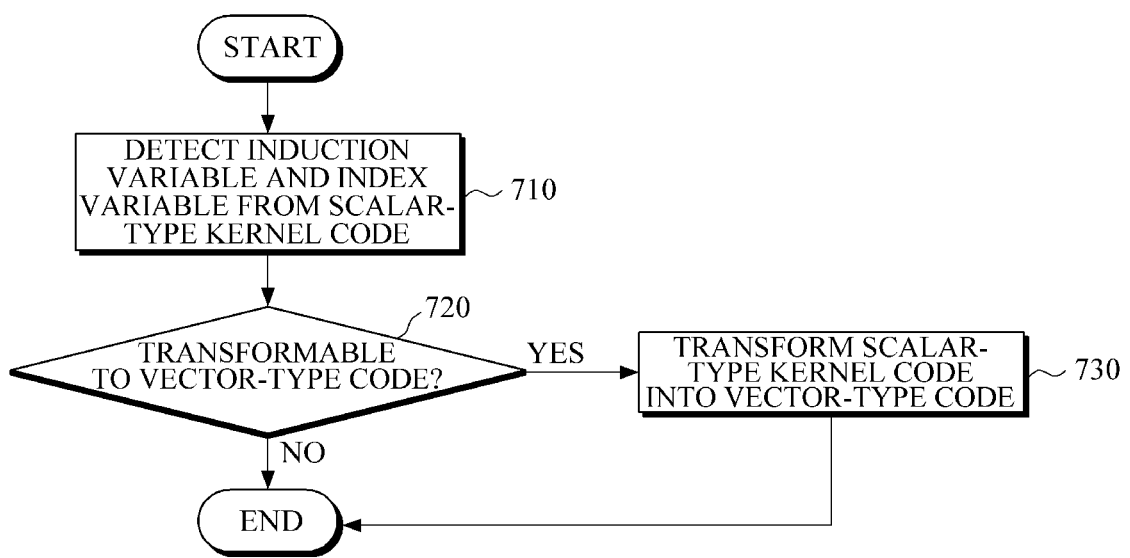
FIG. 7 is a flowchart illustrating a method of determining whether vector code generation from OpenCL kernel code is possible or not.

FIG. 7 is a flowchart illustrating a method of determining whether vector code generation from OpenCL kernel code is possible or not.

Referring to FIG. 7, in 710, the apparatus 300 (refer to FIG. 3) for generating vector code detects an induction variable and a variable used as an index of an array from scalar-type kernel code.

Then, in 720, the apparatus 300 determines whether requirements for transforming the scalar-type kernel code into vector-type code are satisfied, based on the detected induction variable and index variable. Here, the requirements may be the same as the aforementioned requirements 1) to 4).

In response to the requirements being satisfied, the apparatus 300 transforms the scalar-type kernel code into vector-type code in 730.

Figure 8:
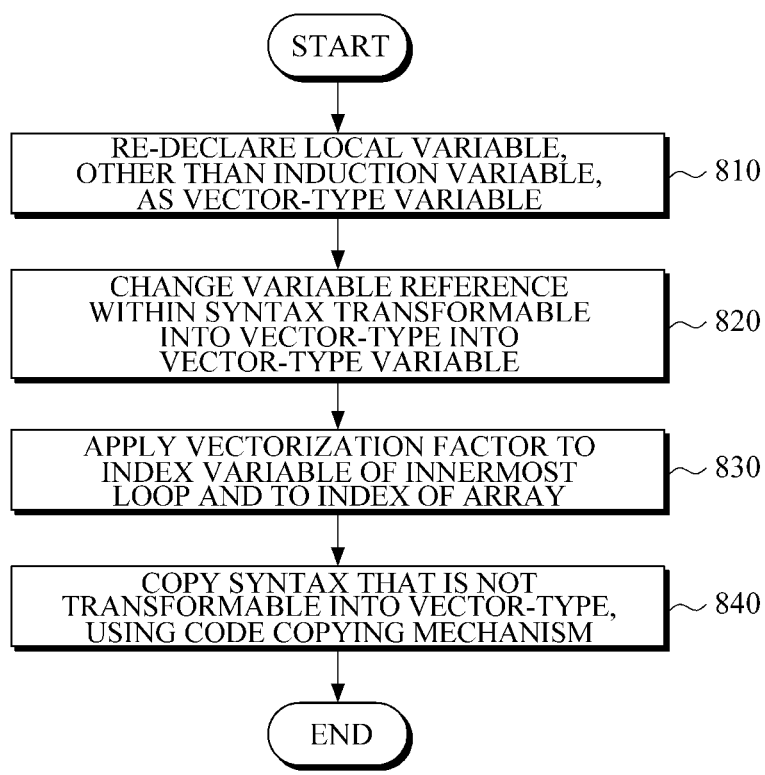
FIG. 8 is a flowchart illustrating a method of generating vector code according to an exemplary embodiment.

FIG. 8 is a flowchart illustrating a method of generating vector code according to an exemplary embodiment.

Referring to FIG. 8, in 810, the apparatus 300 (refer to FIG. 3) for generating vector code re-declares any of variables used as factors of function in the scalar-type kernel code and manually defined variables, other than the induction variable, as vector-type variables.

Then, in 820, the apparatus 300 changes a variable reference used in syntax transformable into vector-type to the re-declared vector-type variable reference.

In 830, the apparatus 300 applies a vectorization factor to the index variable of the innermost loop and to an array index. More specifically, the apparatus 300 may transform an increment of the index variable of the innermost loop in the scalar-type kernel code to a vectorization factor. In addition, the apparatus 300 may divide the induction variable used as the index of the array by the vectorization factor.

In 840, the apparatus 300 copies syntax of the scalar-type kernel code which is unavailable to be transformed to vector-type using a code copying mechanism. In one example, in a case where the scalar-type kernel code contains a conditional branch, the apparatus 300 may copy the conditional branch as many times as a vectorization factor. Here, the apparatus 300 may transform access to a variable and an array within each copied conditional branch into access to sequential vector elements.

The current embodiments can be implemented as computer readable codes in a computer readable record medium. Codes and code segments constituting the computer program can be easily inferred by a skilled computer programmer in the art. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for generating vector code, comprising:
   detecting an induction variable and an index variable from scalar-type kernel code that contains a loop nest that represents an instance of a work-item;
   determining whether requirements for transforming the scalar-type kernel code into vector-type code are satisfied, based on the detected induction variable and index variable; and
   in response to the requirements being satisfied, transforming the scalar-type code into the vector-type code,
   wherein the induction variable represents a linear function of a variable that increases or decreases by a fixed quantity in each iteration of loop or a linear function of another induction variable, and the index variable represents a variable that indicates a location in an array.

2. The method of claim 1, wherein the determining comprises, in response to a determination that index values of arrays within the scalar-type kernel code are discontinuous, determining that the requirements are not satisfied.

3. The method of claim 1, wherein the determining comprises, in response to a determination that an index value of an array within the scalar-type kernel code cannot be statically analyzed, determining that the requirements are not satisfied.

4. The method of claim 1, wherein the determining comprises, in response to the scalar-type kernel code containing access to a private array, determining that the requirements are not satisfied.

5. The method of claim 1, wherein the determining of the scalar-type kernel code comprises, in response to the scalar-type kernel code containing calls to a variable defined by a user or to a function, other than a built-in function, determining that the requirements are not satisfied.

6. The method of claim 1, wherein the transforming of the scalar-type kernel code comprises
   re-declaring any of a variable used as a factor of function within the scalar-type kernel code and a variable defined within the scalar-type kernel code, other than the induction variable, as a vector-type variable, and
   changing a variable reference used within syntax transformable into vector-type in the scalar-type kernel code to the re-declared vector-type variable.

7. The method of claim 6, wherein the syntax transformable into vector-type uses the induction variable as an index of an array and is not a conditional branch.

8. The method of claim 1, wherein the transforming of the scalar-type kernel code comprises applying a vectorization factor to an induction variable of an innermost loop within the loop nest and to an induction variable used as an index of an array.

9. The method of claim 8, wherein the applying of the vectorization factor comprises dividing the induction variable used as the index of the array by the vectorization factor and transforming an increment of the induction variable of the innermost loop within the loop nest to the vectorization factor.

10. The method of claim 1, wherein the transforming of the scalar-type kernel code comprises copying syntax of the scalar-type kernel code which is unavailable to be transformed to the vector-type.

11. The method of claim 1, wherein the transforming of the scalar-type kernel code comprises, in response to the scalar-type kernel code containing a conditional branch, copying the conditional branch as many times as a vectorization factor and transforming access to a variable and an array within a copied conditional branch into access to sequential vector elements.

12. An apparatus for generating vector code, comprising:
    a processor;
    an analyzer configured to detect an induction variable and an index variable from scalar-type kernel code that contains a loop nest that represents an instance of a work-item, using the processor;
    a determiner configured to determine, using the processor, whether requirements for transforming the scalar-type kernel code into vector-type code are satisfied, based on the detected induction variable and index variable; and
    a vector code generator configured to transform, in response to a determination that the requirements are satisfied, the scalar-type kernel code into the vector-type code,
    wherein the induction variable represents a linear function of a variable that increases or decreases by a fixed quantity in each iteration of loop or a linear function of another induction variable, and the index variable represents a variable that indicates a location in an array.

13. The apparatus of claim 12, wherein the determiner is configured to, in response to a determination that index values of arrays within the scalar-type kernel code are discontinuous, determine that the requirements are not satisfied.

14. The apparatus of claim 12, wherein the determiner is configured to, in response to a determination that an index value of an array within the scalar-type kernel code cannot be statically analyzed, determine that the requirements are not satisfied.

15. The apparatus of claim 12, wherein the determiner is configured to, in response to the scalar-type kernel code containing access to a private array, determine that the requirements are not satisfied.

16. The apparatus of claim 12, wherein the determiner is configured to, in response to the scalar-type kernel code containing calls to a variable defined by a user or to a function, other than a built-in function, determine that the requirements are not satisfied.

17. The apparatus of claim 12, wherein the vector code generator is configured to re-declare any of a variable used as a factor of function within the scalar-type kernel code and a variable defined within the scalar-type kernel code, other than the induction variable, as a vector-type variable, and to change a variable reference used within syntax transformable into vector-type in the scalar-type kernel code to the re-declared vector-type variable.

18. The apparatus of claim 17, wherein the syntax transformable into vector-type uses the induction variable as an index of an array and is not a conditional branch.

19. The apparatus of claim 12, wherein the vector code generator is configured to apply a vectorization factor to an induction variable of an innermost loop within the loop nest and to an induction variable used as an index of an array.

20. The apparatus of claim 19, wherein the vector code generator is configured to divide the induction variable used as the index of the array by the vectorization factor and to transform an increment of the induction variable of the innermost loop within the loop nest to the vectorization factor.

21. The apparatus of claim 12, wherein the vector code generator is configured to copy syntax of the scalar-type kernel code which is unavailable to be transformed to the vector-type.

22. The apparatus of claim 12, wherein the vector code generator is configured to, in response to the scalar-type kernel code containing a conditional branch, copy the conditional branch as many times as a vectorization factor and transform access to a variable and an array within a copied conditional branch into access to sequential vector elements.

\* \* \* \* \*